Patented Nov. 21, 1944

2,363,371

UNITED STATES PATENT OFFICE 2,363,371

PROCESS OF FORMING BRIQUETTES, BRICKS, OR SOLID AGGLOMERATES

James C. Vignos, Canton, Ohio, assignor to Ohio Ferro-Alloys Corporation, Canton, Ohio, a corporation of Ohio No Drawing. Application April 23, 1942, Serial No. 440,247

11 Claims. (Cl. 75—3)

The invention relates to an improved binding agent suitable for use in the formation of briquettes, bricks or solid agglomerates from metallic or non-metallic substances, or combinations of metallic or non-metallic substances, and concerns more particularly a binding agent produced by an exothermic chemical reaction between an alkali compound that yields hydroxyl ions in an aqueous solution and an element that will react with an alkaline substance to produce an exothermic reaction.

Although the invention relates broadly to such a binding agent for use in the formation of briquettes, bricks or solid agglomerates of any metallic or non-metallic substances, it relates especially to the briquetting of finely divided ores or oxides for reduction in a furnace, or for charging into a furnace or ladle chemical compounds, ferro-alloys or other metals, or alloys, and for the formation of refractories suitable for furnace linings, etc.

The charging of fine ores into a furnace is an uneconomic operation and subject to many objections such as dusting, mechanical loss in handling and charging, "blowing" due to rapid generation of gases which do not have free passage through the tight mass, arching and the subsequent slippage of burden with its explosive effect, together with other disadvantages.

In an attempt to overcome these objections, various methods of briquetting such fine ores and oxides have been tried, using relatively large amounts of Portland cement, magnesia, gypsum, waste sulphite liqueurs, bitumen or pitch, oleaginous tars, lime or other binders whose use is primarily for holding the constituents of the briquette together.

This necessitates the handling, transportation and addition to the charge or melt, of a considerable quantity of materials that in most cases are of no value to the metal or alloy production, and further must be fluxed and carried away as slag, thus absorbing heat and requiring energy to discard them.

Binding cements not only introduce foreign material not needed in the furnace reaction for reduction, and require their fluxing or removal, but may introduce objectionable elements into the charge or melt, or lose their cementing properties under the extreme temperatures of the reaction.

I have found that such finely divided ores can be quickly and economically formed into briquettes, bricks or solid agglomerates which have none of the objections or disadvantages above referred to.

My invention is based on my discovery that by mixing certain elements with an alkaline substance in the presence of moisture and applying heat when necessary an exothermic reaction is produced forming a binding agent.

The invention further contemplates the forming of metallic or non-metallic substances of various sizes or a combination of both, into briquettes, bricks, or solid agglomerates by incorporating therewith relatively small amounts of an alkaline substance and an element that will react with an alkaline substance to produce the exothermic reaction.

It is therefore an object of the invention to produce briquettes, bricks and solid agglomerates from metallic and non-metallic substances by incorporating therewith a binding agent which results from a chemical reaction between an alkaline substance and an element that will react with an alkaline substance to produce an exothermic reaction in the briquette or agglomerated form or shape.

A further object of the invention is the production of briquettes, bricks or solid agglomerates from metallic and non-metallic substances by incorporating therewith relatively small amounts of silicon, aluminum, or zinc and an alkaline substance and subjecting the same to slight temperature in the presence of moisture.

A further object of the invention is the production of briquettes, bricks or solid agglomerates from finely divided ores mixed with relatively small quantities of silicon, aluminum, or zinc to which slight heat is applied in the presence of moisture.

The above objects together with others which will be apparent from the following description may be attained by carrying out the improved process in the manner hereinafter described in detail.

The principal elements which will react with an alkaline substance to produce this exothermic reaction are silicon, aluminum, and zinc and I have found that by adding relatively small quantities of one or more of these elements and an alkaline substance to a relatively large amount of finely divided ore or fine metallics and moistening the mixture and then slightly heating the exothermic reaction is started and proceeds uniformly and rapidly throughout the entire mass, accompanied in most cases by an audible hissing sound and the evolution of gas and moisture in the form of steam and upon completition of the reaction the particles of ore are firmly bound together in a solid hard mass which may be handled or transported without danger of disintegration and the binding agent does not lose its cementing properties under high temperatures.

The principal elements which enter into reaction with the alkaline substance in forming the binding agent are silicon, aluminum, and zinc, and any of these elements may be used singly or in combination with any of the others, or in the form of alloys with other metals such as iron, copper, chromium, manganese, tungsten, molybdenum, vanadium, titanium and the like. There are other metals which will react with the alkaline substance to produce the exothermic reaction but owing to their cost they are not economically practical at present for use in the process. Of the elements referred to above silicon is preferred for economic reasons, for it is known that vanadium and titanium and other elements will react with strong alkaline substances to produce a similar binding action in addition to the more common and more economic elements mentioned above.

The alkaline substances which enter into the reaction with these elements are alkali metal oxides, peroxides, hydroxides, silicates and aluminates, with a ratio of alkali oxide to silica or alumina at better than that in sodium meta silicate or aluminate or other chemical compounds made alkaline with an excess of the alkali metal oxides, peroxides and hydroxides that yield hydroyl ions in aqueous solution.

It is obvious from the above that the reaction between an element, for example silicon, and an alkaline substance for example sodium hydroxide, produces sodium meta silicate which can be represented by the following reaction.

$Si+2NaOH+H_2O=Na_2SiO_3+4H+Heat$. However, when commercial sodium silicate or water glass is employed as a binder in the mineral or metal field for making of briquettes, bricks or solid agglomerates much larger quantities are required than when produced in the mixture to be briquetted as described above. The results are in no way comparable, for example, briquettes made with sodium silicate require weeks to harden through the cross section, the film formed on the surface prevents the drying of the interior, and if heated to dry out the interior they spall and crack. The products produced by the method described above are of the same moisture content throughout the entire cross section at the completion of the exothermic reaction. Further, the products made from water glass can not be readily handled without ageing or heating for when freshly made they are fragile as compared to the products where the binder results from an exothermic reaction within the briquette as described above they are strong and readily handled as soon as the exothermic reaction is complete. In addition sodium silicate briquettes or bricks are not waterproof, although their water resistant qualities can be increased by a heat treatment after being made. The products resulting from the exothermic reaction within the briquette are not entirely water resistant at completion of the exothermic reaction but become water resistant on ageing without the application of heat.

To illustrate the invention but not to limit it in any way, finely divided chromium ore, not commercially practical for use in a furnace may be formed into briquettes by mixing therewith 0.1 to 5% of silicon, with 0.1 to 10% of caustic soda, with 2 to 10% moisture.

Satisfactory chrome ore bricks have been made within the above range of reacting materials from chrome ore fines, 60 mesh and down and 2.5% of ferro silicon (containing 76% Si) and moistened with 7% water containing 1.5% caustic soda. These materials were well mixed and formed into a brick, and the exothermic reaction started by heating a portion to 50° C. On completion of the exothermic reaction and allowing the brick to cool it was ready for application.

The mixture is pressed into a briquette of desired form and the exothermic reaction is started by heating a spot on the surface of the briquette to over 25° C. The reaction will proceed rapidly and smoothly in all directions throughout the briquette accompanied by an audible hissing sound and the evolution of gas and moisture in the form of steam and in a very few minutes the reaction is complete and the briquette is a solid dry mass firmly bound together and sufficiently hard to permit rough handling, transportation and charging into a furnace.

In the same manner any other metallic ores or oxides may be formed into briquettes, bricks or solid agglomerates.

Any of the metals which react with alkalies to produce the exothermic reaction can be successfully formed into briquettes, bricks or agglomerates. To illustrate this point silicon containing alloys can be formed into briquettes, bricks or solid agglomerates by addition of a small amount of moisture in the form of a sodium hydroxide solution and heating a portion of the surface to above 25° C. to start the exothermic reaction which produces the binding agent.

Aluminum, magnesium and zinc or other metals may in the same manner be formed into briquettes or agglomerates. It has further been found that all metals including their alloys and ferro-alloys can be successfully formed into briquettes, bricks or agglomerates by the binding agent resulting from an exothermic reaction between a metal containing one or more of the elements silicon, aluminum, magnesium or zinc and an alkaline substance which will react with the metal.

As an illustration that ferro-alloys can be successively formed into briquettes but not in any way limiting the invention the following example is given. Ferro-chromium containing 3.5% silicon crushed to 8 mesh and down is moistened with 5% of water in which is dissolved 1.5% sodium hydroxide. This mixture is pressed into a brick and one corner heated to approximately 50° C. to start the exothermic reaction. When the exothermic reaction is completed a hard solid brick is produced which is suitable for rough handling. Other metals which do not contain sufficient silicon, aluminum, or zinc to react with an alkaline substance can be successfully made into briquettes, bricks or solid agglomerates by addition of one or more of the above elements.

It has also been found that mixtures of non-metallic materials as well as metallic materials can be made into briquettes, bricks or agglomerates in the manner described above. As an example which is in no way intended to limit the scope of the invention, fine 75% ferro-silicon and dolomite were mixed together and 3% of water in which was dissolved 1% sodium hydroxide was added to the mixture which was then pressed into a briquette. By heating a portion of the surface of the briquette the exothermic reaction was started and produced a binding agent capable of rough handling and transportation and suitable for making metallic magnesium. Chromite, manganese ore, sodium silicates, vanadium ores and other metallic ore, or oxides can be substituted for the dolomite, and other metallic reducing agents as well as carbonaceous reducing agents can be substituted for the 75% ferro-silicon so long as the mixture contains an element which will react with an alkaline substance.

There has also been found that briquettes, bricks or solid agglomerates can be formed from refractory materials such as magnesia, dolomite, silica, alumina, chromite and the like. The refractory material is mixed with an alkaline substance and one of the elements which will react with the alkaline substance to give an exothermic reaction which will bind the materials together.

To illustrate the above, a mixture of magnesia and alumina in proportions to form a spinel are mixed with 2.5% of an aluminum alloy and moistened with 8% of a solution containing 20% sodium meta silicate with 25% free sodium oxide. The mixture was rammed into a furnace for a lining and heat was applied to a portion of the surface thereof starting the exothermic reaction which proceeded in all directions throughout the entire furnace lining. When the reaction was completed a solid furnace lining was produced ready for burning in for the final refractory state.

The reaction taking place in this case is the same as previously illustrated for the commercial sodium silicate products containing better than a 1 to 1 ratio of sodium oxide to silica consisting of sodium meta silicate and free sodium oxide. The free sodium oxide on going into solution forms the hydroxide which reacts with the free silicon to give an exothermic reaction with the formation of sodium meta silicate.

To further illustrate this point but in no way to limit the scope of the invention, chromite and silica brick have been made by mixing 2.5% ferro-silicon alloy containing 76% silicon with the chromite and adding 1.5% sodium hydroxide and 4% moisture. The mixture was pressed into the desired form and the exothermic reaction started by heating a portion of the surface of the brick to over 25° C.

The exothermic reaction is controlled by the amount and kind of element and the concentration of the reacting alkali solution and the temperatures required to start the reaction in which formation of the briquettes, bricks or solid agglomerates with the reacted binding agent follows the general rules as to fineness of material, pressure and moisture. For example, to a degree the coarser the material the less moisture and binding reagent are required whereas the finer the material the more moisture and binding reagent are required, and the greater the pressure the less binding reagent is required.

I claim:

1. The process of forming briquettes, bricks or solid agglomerates from loose fragments of inorganic substances which consists in mixing said loose fragments with relatively small quantities of an alkaline substance that yields hydroxyl ions in an aqueous solution and an element taken from a group consisting of silicon, aluminum, and zinc, and a small quantity of moisture, forming the mixture into briquettes, bricks or agglomerates of desired form, and applying sufficient heat to the surfaces of the briquettes, bricks or agglomerates to start an exothermic reaction between the element and the alkaline substance within the formed object.

2. The process of forming briquettes, bricks or solid agglomerates of loose fragments of metallic substance which consists in mixing said loose fragments of metallic substance with relatively small quantities of an alkaline substance that yields hydroxyl ions in an aqueous solution and an element taken from a group consisting of silicon, aluminum, and zinc, and a small quantity of moisture, forming the mixture into briquettes, bricks or agglomerates of desired form, and applying sufficient heat to the surfaces of the briquettes, bricks or agglomerates to start an exothermic reaction between the element and the alkaline substance within the formed object.

3. The process of forming briquettes from metallic ores or oxides which consists in mixing said ores or oxides with relatively small quantities of an alkaline substance that yields hydroxyl ions in an aqueous solution and an element taken from a group consisting of silicon, aluminum, and zinc, and a small quantity of moisture, forming the mixture into briquettes of desired form, and applying sufficient heat to the surfaces of the briquettes to start an exothermic reaction between the element and the alkaline substance within the formed briquettes.

4. The process of forming briquettes, bricks or solid agglomerates from loose fragments of inorganic substance which consists in mixing said loose fragments with 0.1% to 10% of an alkaline substance that yields hydroxyl ions in an aqueous solution, and 0.1% to 5% of an element taken from a group consisting of silicon, aluminum, and zinc, and 2% to 10% moisture, forming the mixture into briquettes, bricks or agglomerates of desired form, and applying sufficient heat to the surface of the briquettes, bricks or solid agglomerates to start an exothermic reaction between the element and the alkaline substance within the formed object.

5. The process of forming chrome ore bricks from fine chrome ore which consists in mixing said chrome ore with 2.5% of ferro-silicon containing 76% silicon, 1.5% caustic soda and 7% water, forming the mixture into bricks and heating a portion of each brick to about 50° C. to start an exothermic reaction by the silicon and the caustic soda.

6. The process of forming briquettes and the like from fine metallic ore which consists in mixing said ore with relatively small amounts of ferro-silicon and caustic soda and water, forming the mixture into briquettes and heating a portion of each briquette to a sufficient temperature to start an exothermic reaction between the silicon and the caustic soda.

7. The process of forming briquettes and the like from fine metallic ore which consists in mixing said ore with 0.1% to 5.0% of silicon, 0.1% to 10.0% of caustic soda and 2.0% to 10.0% of moisture, forming the mixture into briquettes and heating a portion of each briquette to a sufficient temperature to start an exothermic reaction between the silicon and the caustic soda.

8. The process of forming briquettes and the like from metallic substances which consists in mixing fragments of ferro-chromium containing about 3.5% silicon with about 5% of water in which is dissolved about 1.5% sodium hydroxide, forming the mixture into a briquette and heating a portion of the briquette to about 50° C. to start an exothermic reaction between the silicon and the sodium hydroxide.

9. The process of forming briquettes and the like from chromite which consists in mixing the chromite with about 2.5% ferro-silicon alloy containing about 76% silicon and about 1.5% sodium hydroxide and about 4% moisture, forming the mixture into a briquette and heating a portion of the briquette to over 25° C. to start an exothermic reaction between the silicon and the sodium hydroxide.

10. The process of forming briquettes and the like from loose fragments of metallic substance which consists in mixing said loose fragments of metallic substance with a relatively small quantity of an alkaline substance that yields hydroxyl ions in an aqueous solution taken from a group consisting of alkali metal oxides, peroxides, hydroxides and silicates and aluminates with a ratio of alkali oxide to silica or alumina at better than one to one, and a small quantity of silicon and a small quantity of water, forming the mixture into briquettes and the like and applying sufficient heat to the surfaces of the briquettes to start an exothermic reaction between the silicon and the alkaline substance.

11. The process of forming briquettes and the like from metallic substances which consists in mixing fragments of metal alloy containing over 2.% silicon with about 5% of water in which is dissolved about 1.5% sodium hydroxide, forming the mixture into a briquette and heating a portion of the briquette to about 50° C. to start an exothermic reaction between the silicon and the sodium hydroxide.

JAMES C. VIGNOS.